(12) United States Patent
Basrur et al.

(10) Patent No.: US 10,817,901 B2
(45) Date of Patent: Oct. 27, 2020

(54) TRAILING COMMUNICATION FLOW INTEGRATION

(71) Applicant: SAP SE, Walldorf (DE)

(72) Inventors: Hemanth Basrur, Bangalore (IN); Priyanka Priyadarshini, Bangalore (IN)

(73) Assignee: SAP SE, Walldorf (DE)

( * ) Notice: Subject to any disclaimer, the term of this patent is extended or adjusted under 35 U.S.C. 154(b) by 67 days.

(21) Appl. No.: 16/042,149

(22) Filed: Jul. 23, 2018

(65) Prior Publication Data

US 2020/0027122 A1   Jan. 23, 2020

(51) Int. Cl.
*G06Q 30/02* (2012.01)
*G06Q 50/00* (2012.01)
*H04L 12/58* (2006.01)

(52) U.S. Cl.
CPC ..... *G06Q 30/0251* (2013.01); *G06Q 30/0277* (2013.01); *G06Q 50/01* (2013.01); *H04L 51/22* (2013.01)

(58) Field of Classification Search
CPC .............. G06Q 30/0207–30/0277; G06Q 3/02
USPC ............................................. 705/14.1–14.73
See application file for complete search history.

(56) References Cited

U.S. PATENT DOCUMENTS

| | | | | |
|---|---|---|---|---|
| 2007/0041562 | A1* | 2/2007 | Bernier | H04M 3/5158 379/265.01 |
| 2008/0229233 | A1* | 9/2008 | Blattner | G06F 9/453 715/781 |
| 2008/0243610 | A1* | 10/2008 | Ragno | G06Q 30/02 705/14.73 |
| 2013/0031470 | A1* | 1/2013 | Daly, Jr. | G06F 17/211 715/243 |
| 2014/0108309 | A1* | 4/2014 | Frank | G06Q 10/00 706/12 |
| 2015/0026719 | A1* | 1/2015 | Menon | H04N 21/2668 725/34 |
| 2015/0066654 | A1* | 3/2015 | Kannan | G06Q 30/0271 705/14.66 |
| 2016/0343029 | A1* | 11/2016 | Sethuraman | G06Q 30/0255 |
| 2017/0262165 | A9* | 9/2017 | Calvillo | G06F 3/0481 |

* cited by examiner

*Primary Examiner* — Afaf Osman Bilal Ahmed
(74) *Attorney, Agent, or Firm* — Buckley, Maschoff & Talwalkar LLC

(57) ABSTRACT

Provided is a method and system for integrating a trailing communication flow with a scheduled communication flow. In one example, the method may include executing a scheduled communication flow based on a first container organized via a user interface, the first container identifying a plurality of communications to perform based on actions of a user, detecting occurrence of a trigger associated with the user based on the execution of the scheduled communication flow, identifying a second container organized via the user interface which is linked to the detected trigger, the second container identifying one or more follow-up communications to perform based on additional actions of the user, and dynamically executing a trailing communication flow with respect to the scheduled communication flow based on the second container.

19 Claims, 8 Drawing Sheets

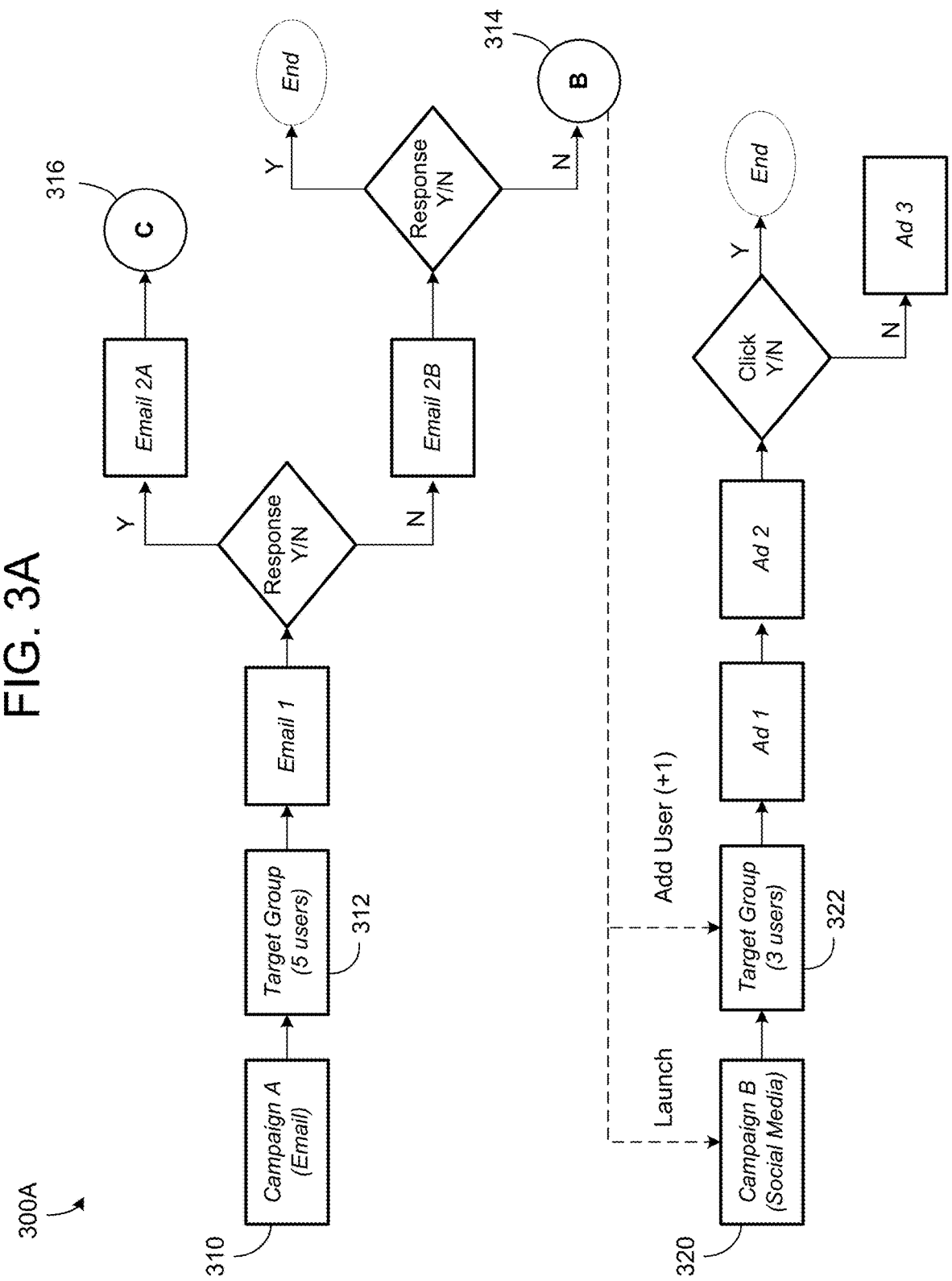

(Design Time)

(Run Time)

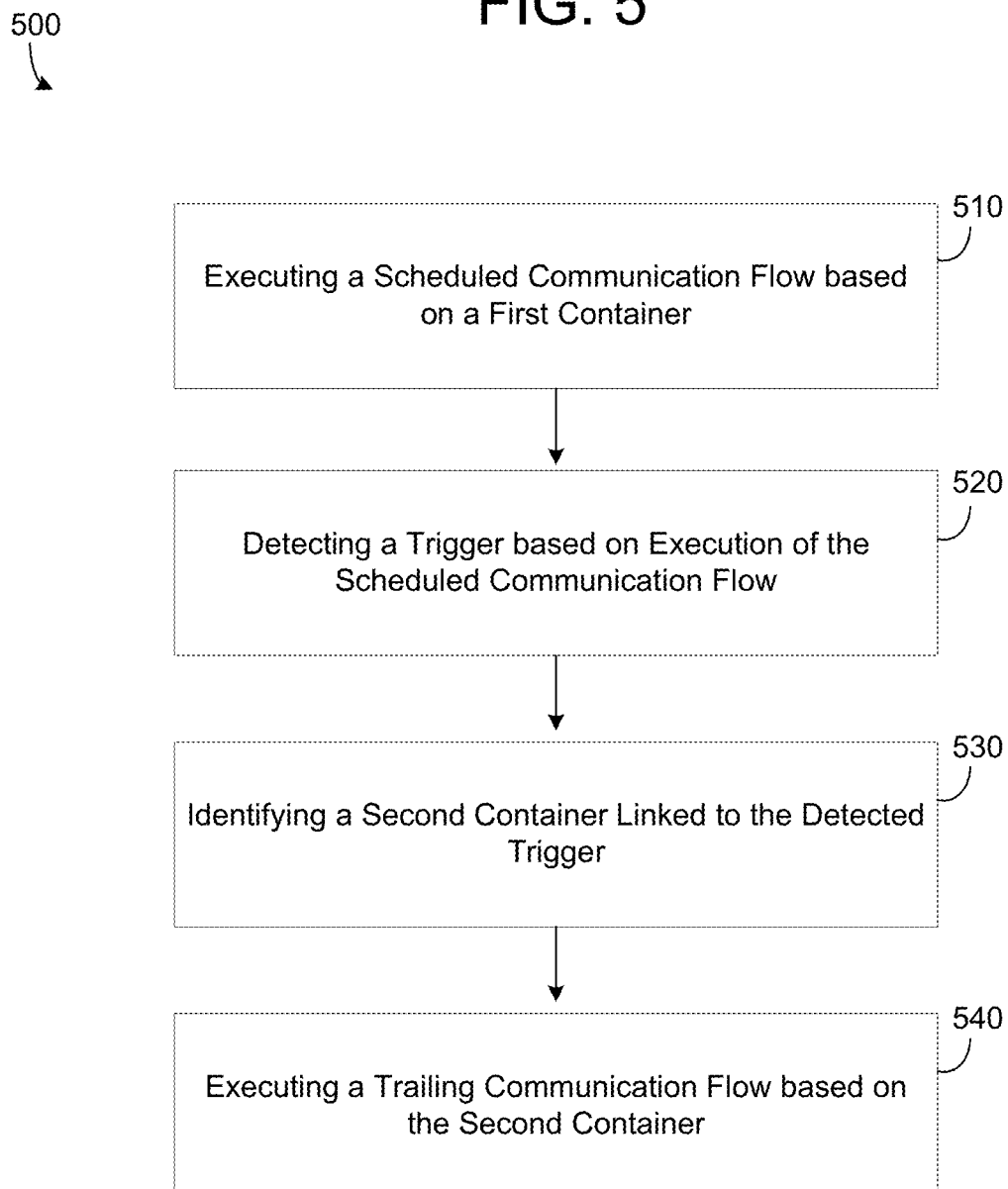

TRAILING COMMUNICATION FLOW INTEGRATION

BACKGROUND

Communication-based software enables organizations to generate and transmit automated communications (e.g., campaigns) to a targeted group of users. The content of a campaign may be communicated to the targeted users through various channels such as electronic messages (e.g., email, short messaging service (SMS), etc.), phone calls (mobile), social media sites, and the like. However, communication-based software suffers from various limitations. For example, a campaign is typically designed so as to be interesting to a wide variety of users without alienating users. As a result, a single campaign typically includes only a few queries which solicit small bits of information. Therefore, in order to gather detailed information about the interests of a particular user, multiple campaigns are often needed.

However, present communication-based software does not provide a mechanism for linking together different campaigns (or information determined thereby) in a reusable way. As a result, each campaign is typically generated in isolation and runs as a separate flow of communication. Furthermore, present campaign-based software does not provide an ability to move/copy data from one campaign into another campaign even if both campaigns involve one or more common target users.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 3A-3B are diagrams illustrating a process of integrating a trailing communication flow based on a trail container in accordance with example embodiment.

FIG. 5 is a diagram illustrating a method of integrating a trailing communication flow in accordance with an example embodiment.

Figure 1:
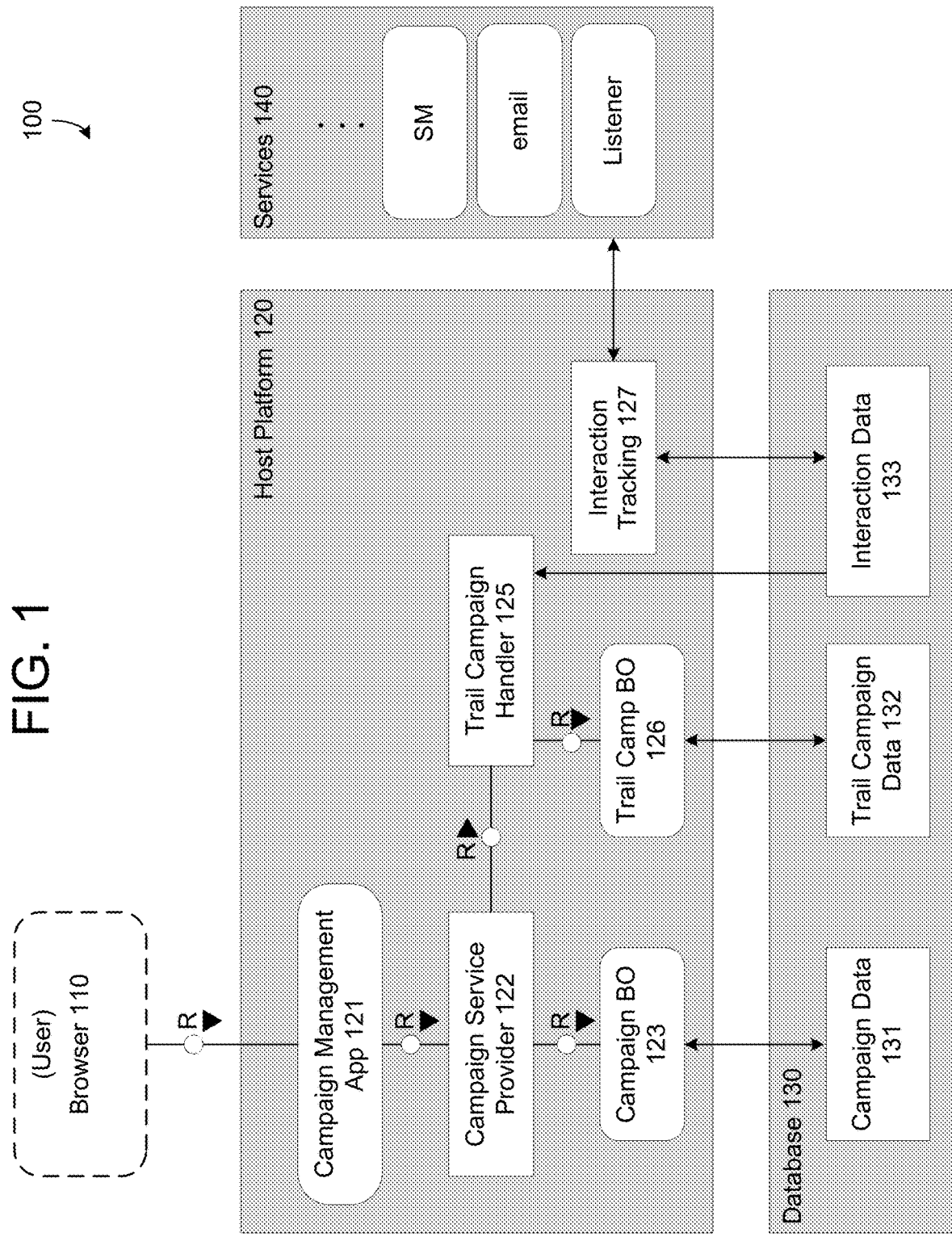
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Marketers use campaign-based software applications to create various campaigns to inform customers about their products or services. A campaign is a container that can be used various activities focused on customers, prospects, or contact persons that have been categorized into a target group. For example, a campaign can be used to prepare the launch of a detailed sales promotions to increase profit margin. A marketer can create various types of campaigns such as an email campaign, a mobile campaign, a social media campaign (e.g., FACEBOOK®, TWITTER®, etc.) a GOOGLE® AdWords Campaign, a lead transfer campaign, and many more. However, a marketer is typically allowed to create one campaign at a time due to software restrictions. Here, campaigns are not capable of being linked to one another but require independent design, configuration, and startup. Furthermore, user contacts are not transferrable from a target group of one campaign to a target group of another campaign even in a situation where the campaigns are likely to have one or more common target users.

The example embodiments support a technical improvement to the way campaign-based software operates by enabling campaigns to be linked together as a consecutive series and by allowing information from one campaign to be integrated into another campaign. For example, the system can link together a trail campaign with a parent campaign. As an example, a trail campaign can be triggered by a user reaction or lack of reaction within the initial parent campaign. In response to the trigger, the system can automatically launch the trail campaign and move contact information of the user from the target group of the parent campaign into the target group of the trail campaign. Here, the user may be added to the trailing campaign if the user meets or matches a target group user criteria (e.g., age, demographic, habits, etc.) In some embodiments, campaign data may be carried forward into the trail campaign in addition to the user information. For example, the campaign layout (e.g., email, SMS, social media, etc.) may be carried into the trail campaign enabling easy reuse. By linking together different campaigns into a serially-linked group of campaigns, additional user information can be queried and followed-up on through a more detailed automated manner.

FIG. 1 illustrates a database system architecture 100 in accordance with an example embodiment. Referring to FIG. 1, the architecture includes a host platform 120 that stores and retrieves data from a database 130, and the also receives external information from services 140. For example, the host platform 120 may be a cloud platform, a server, a database node, or the like, which are accessible over a network such as the Internet. The database 130 may include a data store, a database management system (DBMS), and the like, storing data in a tabular format (row, column, page, etc.) In some embodiments, the host platform 120 and the database 130 may be part of a common platform, or they may be independent systems connected via a network such as the Internet. Furthermore, the host platform 120 may also receive information from services 140 which are configured to listen to and detect response information from users interacting with campaigns. Services 140 may be hosted by one or more web servers which are integrated or separate from host platform 120.

According to various embodiments, a client device having a web browser 110 may access an application hosted by host platform 120, via a network. For example, the application may be a campaign management application 121 that enables a user (e.g., a marketer) to generate and send an automated campaign of communications to a targeted group of user recipients. As described herein, a campaign may include a series of communications which are to be sent to a group of targeted users. The communications may include emails, phone calls (mobile), SMS, social media ads, and the like. Each campaign may be implemented as a container of nodes which represent various attributes of a campaign such as the communications, the target users, campaign data, and the like. The container may also include links between the nodes indicating an order (e.g., a relationship) of the communications with respect to each other.

The campaign management application 121 may provide a user interface via the web browser 110 that enables the user to drag-and-drop or otherwise make selections to create a new campaign, modify an existing campaign, and delete campaigns. Through the campaign management application 121, the user may generate an initial (parent) campaign business object 123 which is managed by a campaign server provider 122 and which uses underlying campaign data 131 stored at the database 130. Here, the campaign business object 123 may include a communication flow modeled as a container. The container of the campaign business object 123 may include nodes representing communications and lines/arrows representing a flow between the communications. The campaign business object 123 may be based on a template of communication (e.g., email, SMS, mobile, social media, etc.) with one or more triggers, actions, conditions, etc. included therein. The campaign management application 121 is an application that is based on the campaign business object 123. During execution, campaign data 131 from the database 130 can be accessed based on information within the campaign business object 123.

The campaign server provider 122 may be an Open Data Protocol (OData) service which allows the creation and consumption of queryable and interoperable Representational State Transfer (RESTful) application programming interfaces (APIs) for interacting with the campaign business object 123. The campaign service provider 122 can execute a campaign based on the campaign template stored in the campaign business object 123. For example, the campaign service provider 122 may be used to read and update campaign data 131 and the campaign business object 123 while the campaign is being executed by the host platform 120. The campaign data 131 may include data used by the campaign during execution as well as result data from the execution. For example, the campaign data 131 may store a flow of communication for the campaign, contact information of target users, layout information, historical run information of the campaign, success information of the campaign, linkage information with other campaigns, and the like.

According to various embodiments, the host platform 120 further includes a trail campaign handler 125, a trail campaign object 126, and an interaction tracker 127. Here, the trail campaign object 126 corresponds to a container of a trail campaign which is triggered during execution of the parent campaign. Similar to the campaign business object 123, the trail campaign object 126 may include nodes and lines/arrows representing communications and a flow between the communications of the trail campaign. The trail campaign object 126 may be based on a template of the campaign business object 123 or a different or new template. The user can create the trail campaign object 126 and modify the trail campaign object 126 via the user interface of the campaign management application 121.

The trail campaign handler service 125 may include APIs to read and update the trail campaign object 126 during execution of the trail campaign by the host platform 120 (e.g., in response to interactions with a targeted user, etc.) Here, the trail campaign handler service 125 may read data about the initial campaign and its execution from the campaign service provider 122. During execution, trail campaign data 132 from the database 130 can be accessed based on information within the trail campaign object 126. The trail campaign data 132 may include a flow of communication for the trail campaign, contact information of target users, layout information, historical run information of the trail campaign, success information of the trail campaign, linkage information with other campaigns, and the like. Furthermore, interactions of a targeted user may be detected during execution of the campaign and/or the trail campaign by the services 140 and stored as a report within interaction tracker 127. Database 130 may store information about which interactions cause triggers within interaction data 133. When a trigger (interaction) within a parent campaign is detected by the trail campaign handler 125 based on parent campaign data that can be read by the trail campaign handler service 125 from the campaign service provider 122, the trail campaign handler 125 can launch the trail campaign in response.

The database 130 may comprise any query-responsive data source or sources that are or become known, including but not limited to a structured-query language (SQL) relational database management system. The database 130 may include a relational database, a multi-dimensional database, an Extensible Markup Language (XML) document, or any other data storage system storing structured and/or unstructured data. The data stored within the database 130 may be distributed among several relational databases, dimensional databases, and/or other data sources. Embodiments are not limited to any number or types of data sources. In some embodiments, the data may include files having one or more of conventional tabular data, row-based data, column-based data, object-based data, and the like. Moreover, the data may be indexed and/or selectively replicated in an index to allow fast searching and retrieval thereof. The database 130 may support multi-tenancy to separately support multiple unrelated clients by providing multiple logical database systems which are programmatically isolated from one another. Furthermore, the database 130 may support colocation of groups of client data.

According to various embodiments, during design time, a trail campaign business object 126 may be created and stored at the trail campaign storage 132. In the trail campaign storage 132, the trail campaign business object 126 may include a root node of a parent campaign (starting campaign) such as campaign business object 123. The trail campaign business object 126 may include a target group node identifying target users and their contact information, a trigger condition node identifying one or more actions (or non-reactions) in the parent campaign which trigger the trail campaign, and the like. The trigger conditions can be dynamically modified by a user. In some cases, the trail campaign business object 126 may include one or more child campaigns of the trail campaign each with a target group node.

During design time, the user (via web browser 110) may configure the trigger conditions which cause the host platform 120 to auto trigger execution of the trail campaign linked to the execution of the parent campaign. The user may schedule execution of the parent campaign, only. Here, the host platform 120 may receive interactions of the target users of the parent campaign and auto trigger one or more subsequent trail campaigns for one or more target users (i.e., a subset of users) of the parent campaign based on actions and responses of the subset of users during the parent campaign.

Each campaign described herein may include a target group which is defined via the container of the campaign. For example, the target group may be embedded in a node of the modeled campaign stored in the container. The target group may include a set of customers, suspects or contact persons, categorized according to criteria, such as geographical location, common interest, and the like. The target group can be used in marketing activities, for example, to promote products or services. Based on a target group, the sales person can create a campaign to prepare for follow-on actions, such as marketing campaigns. In some embodiments the target group may include key information about the target group, such as ID, status, members, etc., and additional information desired which can be stored in a dedicated free text field of the container.

Figure 2:
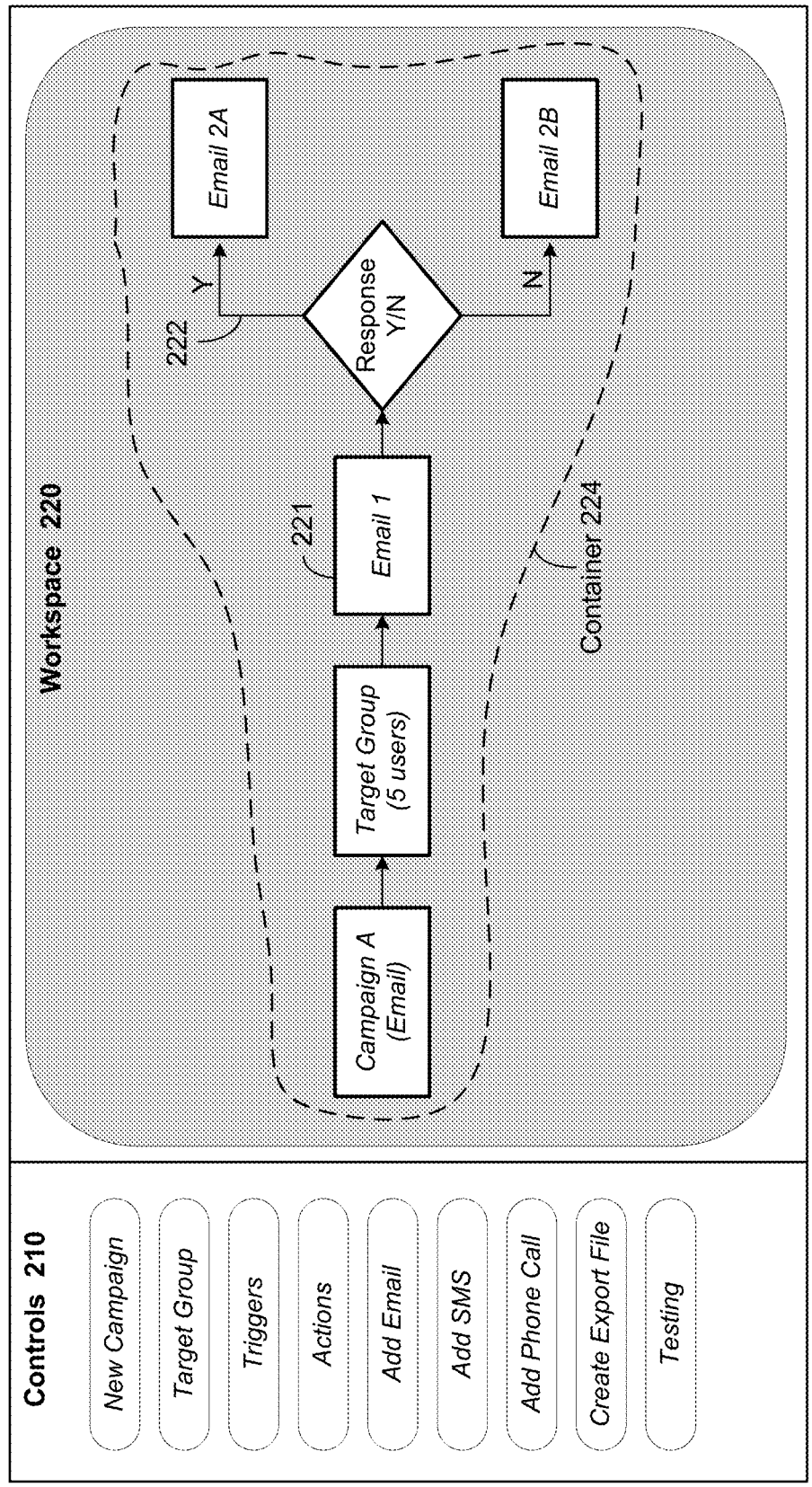
FIG. 2 is a diagram illustrating a user interface for designing a communication flow in accordance with an example embodiment.

FIG. 2 illustrates a user interface 200 for designing a communication flow in accordance with an example embodiment. As described herein, a communication flow may also be referred to as a campaign which can be used for marketing, sales, or other forms of communication with a target group of users. In some cases, the campaign may be created from scratch or it may be based off of a template. Referring to the example of FIG. 2, the user interface 200 includes a workspace 220 where new campaigns can be designed or pre-existing campaigns can be modified, and a panel including a plurality of selection controls 210 which can be used to control changes to a campaign being designed and/or modified via the workspace 220. The finished design of a campaign may be exported to file and may be saves as a container 224 including a communication flow in which nodes are used to represent attributes of the campaign and links are used to represent relationships between the nodes.

Examples of the types of controls 210 that may be available via the user interface 200 include, but are not limited to, creating a new campaign, adding or modifying a target group of users, adding communications such as emails, SMS, phone calls, social media advertisements, etc., creating an export file which can be used to execute a campaign, testing execution of the campaign, previewing the campaign, and the like. Each item that is added to the campaign via the user interface 200 may include a node 221 linked with other nodes via links 222 which provide an order of execution. Campaigns can be executed over time. For example, an end-to-end execution of a campaign can take seconds when all of the communications occur immediately. As another example, a campaign can take days, weeks, months, etc., when communications are spread out or contingent on responses or other actions or lack of action from a targeted user.

In the example of FIG. 2, an email campaign is designed via the workspace 220 and then saved as a container 224 which includes the information about the attributes of the campaign as well as a flow of communication. Each of the nodes 221 may be an attribute or part of an attribute of the campaign. Meanwhile, the flow of communication may be modeled based on lines and arrows or other known means. Here, the nodes include nodes identifying a target group of users, nodes identifying communications (emails), a node identifying a decision based on user interaction, and the like. It should also be appreciated that a campaign may include information about triggers (shown in the controls 210) which can link a campaign being designed via the user interface 200 to a trail campaign which is not currently shown on the user interface or which is also being shown on the user interface. An example of linking a parent campaign to a trail campaign is shown and described with respect to FIGS. 3A-3B.

Figure 3B:
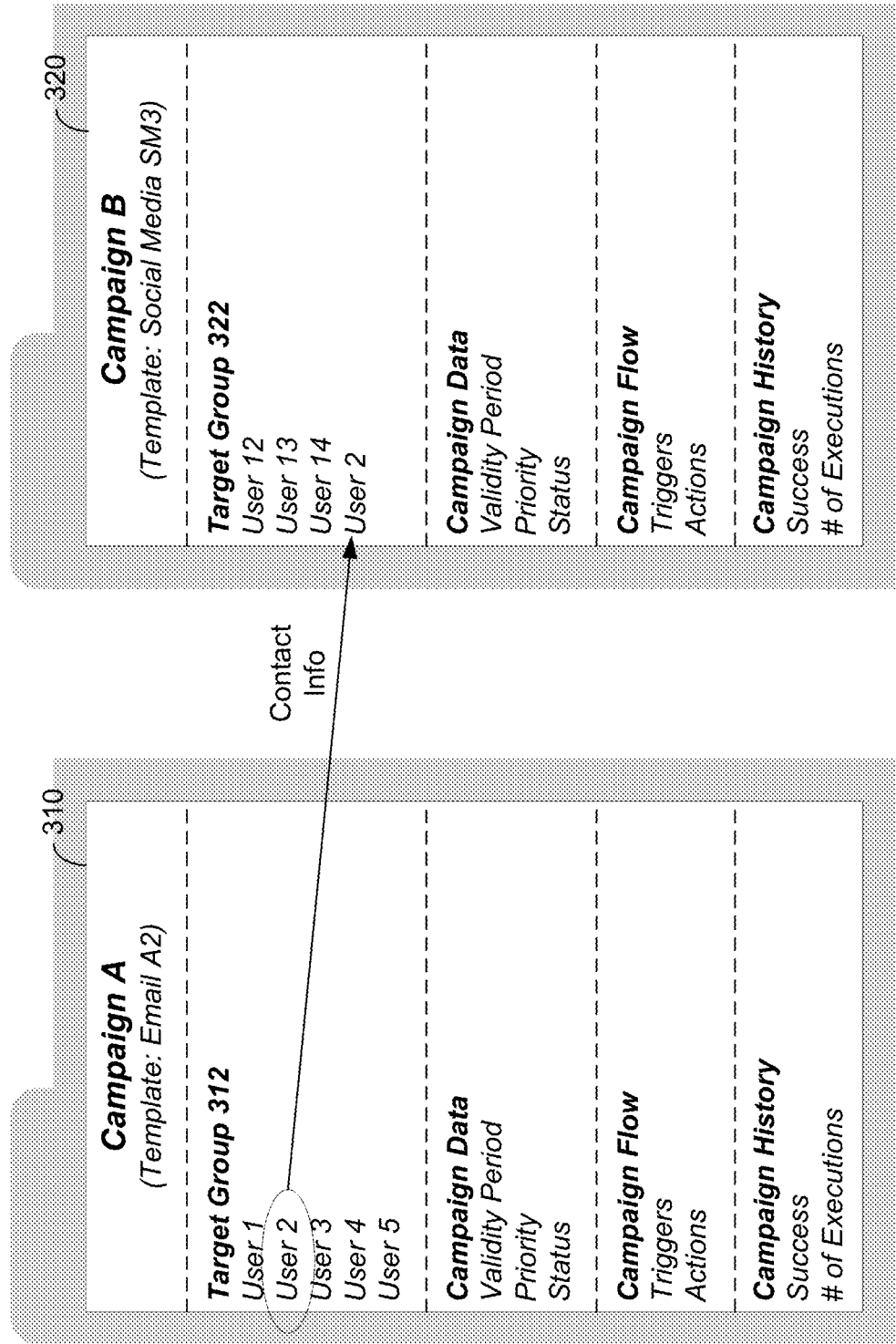

FIGS. 3A and 3B illustrates a process 300A of integrating a trailing communication flow based on a trail container in accordance with example embodiment. The process 300A may be performed by a host platform or other device such as a server, database node, user device, or the like. Referring to FIG. 3A, a parent campaign container 310 includes an initial series of communications which are scheduled to be performed. Meanwhile, a trail campaign container 320 may be linked to the communication flow of the parent campaign container 310. For example, a trigger condition 314 may be embedded within the communication flow of the parent campaign container 310. As an example, the trigger condition can be initialized based on a response or a communication from a target user, a lack of response from a target user, automatically after occurrence of a portion of the parent campaign, or the like. During runtime of a campaign based on the communication flow included in parent campaign container 310, the trigger condition can cause a trail campaign to be executed.

In the example of FIG. 3A, the parent campaign container 310 corresponds to an email campaign that includes a group of 5 target users which are included within a node 312 of the parent campaign container 310. Each of the users may have contact information (phone, email, social media information, address, name, etc.) which are stored within a file or other database record that stores the parent campaign container 310. A host platform may execute the communication flow modeled within the parent campaign container 310. When the communication flow of the parent campaign container 310 reaches trigger condition 314 during run time, the host platform may automatically trigger the start of execution of a trail campaign represented by the trail campaign container 320. In this example, the trail campaign is a social media advertising campaign.

The trail campaign container 320 includes a target group of users 322 with three users, initially. When the trigger condition 314 is reached during runtime of the parent campaign based on the communication flow in the parent campaign container 310, the host platform can launch the trail campaign based on the communication flow within trail campaign container 320, and add a user that caused the trigger from the target users 312 of the parent campaign to the target users 322 of the trail campaign stored in the trail campaign container 320.

As shown in FIG. 3B, the target user 2 is the user that triggers the trail campaign to be executed. Here, the host platform may extract contact information of the target user 2 from the target group information 312 of the parent campaign container 310, and add the contact information of the target user 2 to the previously established target group 322 of the trail campaign container 320. In this case, the target user 2 may not be within the criteria of the target group of users of the trail campaign container 320. However, the host platform may add the target user 2 into the previously established group of target users "on the fly" and without requiring a change to be made to a design of the trail campaign container 320 via the user interface of the campaign management application. Furthermore, the host platform can launch the trail campaign based on execution of the communication data flow stored within trail campaign container 320.

As further shown in FIG. 3B, each campaign container (e.g., parent campaign container 310 and trail campaign container 320) may store information such as contact information for a group of target users, status information indicating which users are currently receiving the campaign, success rate of the campaign, historical runs of the campaign, validity period of time for the campaign, communication flow information such as communications, triggers, action/responses that are expected, and the like.

Referring again to FIG. 3A, it should be appreciated that multiple conditions/triggers may be included within a same campaign. For example, the workflow stored in the parent campaign container 310 includes another trigger condition 316 which links to a different trail campaign (not shown). Accordingly, the parent campaign can include channels into a plurality of different trail campaigns based on actions/responses of a target user to the parent campaign.

Figure 4A:
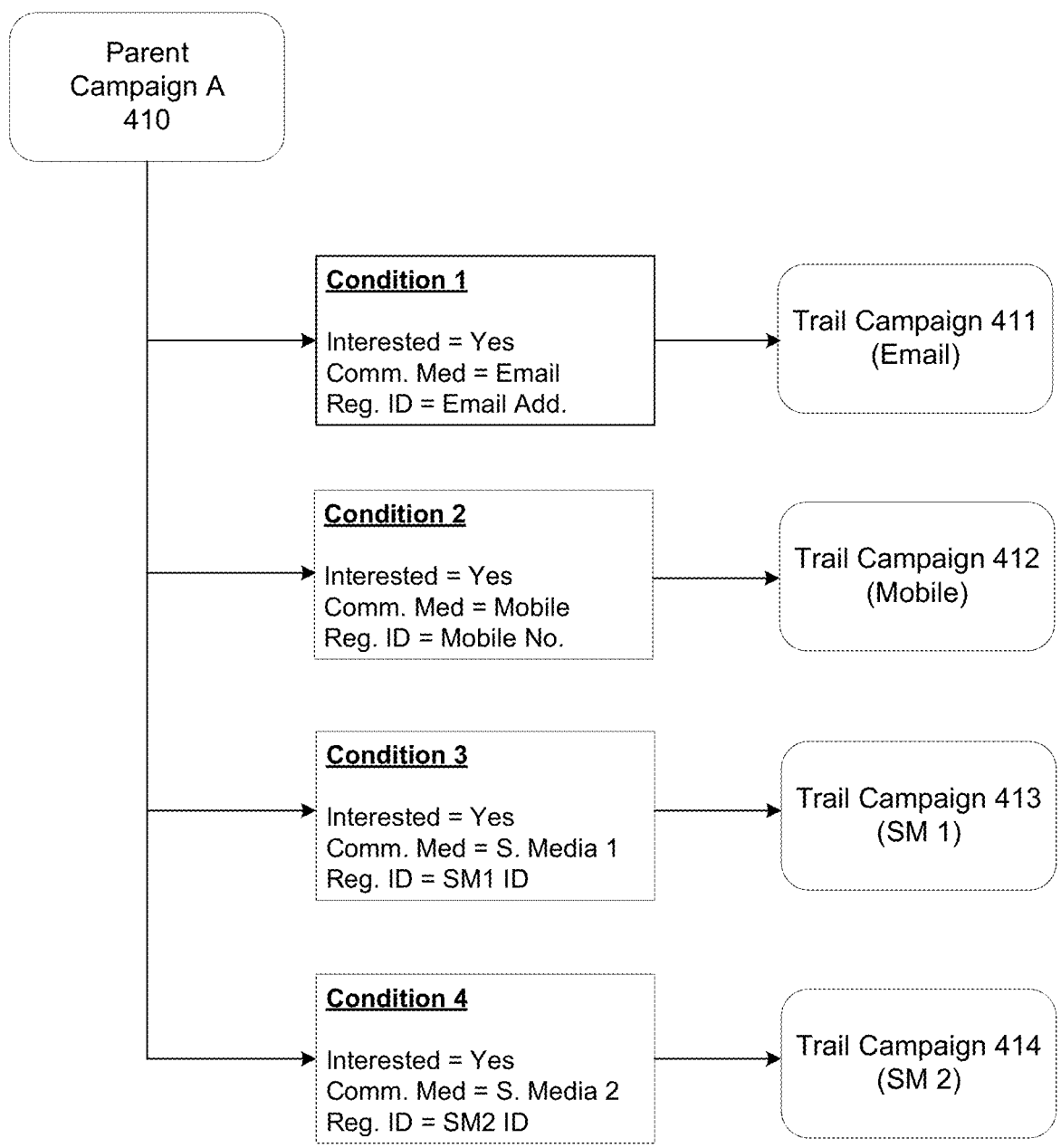
FIG. 4A is a diagram illustrating a design of trailing communication flow with multiple options in accordance with an example embodiment.
Figure 4B:
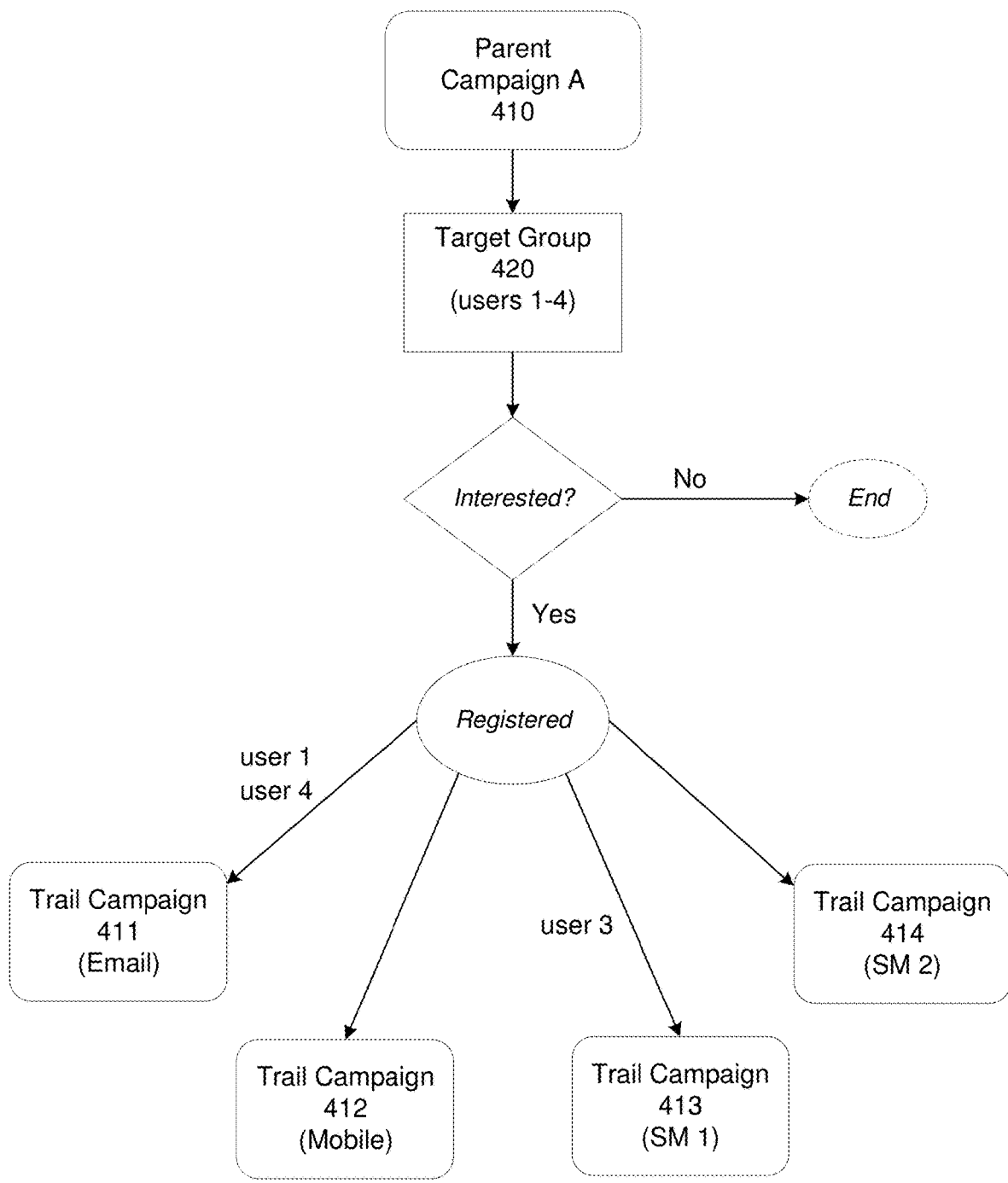
FIG. 4B is a diagram illustrating a process of executing the trailing communication flow of FIG. 4A, in accordance with an example embodiment.

FIG. 4A illustrates a design 400A of a trailing communication flow with multiple conditional options, in accordance with an example embodiment, and FIG. 4B illustrates a process 400B of executing a trailing communication flow based on the design 400A FIG. 4A, in accordance with an example embodiment. FIG. 4A may be referred to as a container or partial container including a modeled communication flow in which a parent campaign 410 is conditionally linked to four different trail campaigns 411-414. Each of the four trail campaigns 411-414 are based off of different triggers.

In particular, trail campaign 411 is triggered when a user is interested in receiving further communications, the user has requested email communications, and the user's email ID has been registered. Also, trail campaigns 412, 413, and 414 also require that the user be interested in receiving further communications while trail campaign 412 requires mobile ID (phone number) and a request for communication via phone, trail campaign 413 requires a first social media ID and a request to communicate via the first social media site (e.g., LINKEDIN®, etc.), and trail campaign 414 requires a second social media ID and a request to communicate via the second social media site (e.g., TWITTER®, etc.)

FIG. 4B illustrates a process of conditions being chosen based on interactions by a target user during execution of the parent campaign 410. In this example, the parent campaign 410 is an email campaign that is sent to a target group of users 420 who all are within a specific category of users (e.g., geography, age, etc.) Based on Interactions received from the users or contacts within the target group 420, the next steps are executed. For example, if user 1 is interested and has registered via Email, then a subsequent email campaign 411 runs for user 1 based on contact information of user 1 being taken from target group 420 and added to a target group of trail campaign 411. Here, a new target group which is subset of target group 420 is created and auto assigned to the trail campaign 411.

As another example, assume user 2 of target group 420 is not interested. In this case, no further campaigns are sent. As another example, user 3 is interested and has registered a social media ID from a first social media site. In this example, a trail campaign 413 runs for user 3 based on the contact information. Here, a new target group which is subset of target group 420 is created and auto assigned to the trail campaign 413. As another example, assume user 4 is interested and has and have registered via email, then the trail campaign 411 runs for user 4. Here, contact information of user 4 is also added to the subset of users in the target group of trail campaign 411. According to various embodiment, trail campaigns 411-414 may be auto triggered with contacts from the target group 420 being filtered to create new auto created target groups for the trail campaigns 411-414 based on user interactions with the parent campaign 410.

FIG. 5 illustrates a method 500 for inserting a data file in an unbalanced partition, in accordance with an example embodiment. As an example, the method 500 may be performed by a database node included within a distributed database system. As another example, the method 500 may be performed by a computing device such as a server, a cloud platform, a user device, an on-premises server, and the like. In some examples, the method 500 may be performed by a plurality of devices in combination. Referring to FIG. 5, in 510, the method may include executing a scheduled communication flow based on a first container organized via a user interface, the first container identifying a plurality of communications to perform based on actions of a user. The scheduled communication flow may be modeled via a user interface. The model may be stored as a container that represents the communication flow with nodes and links between the nodes.

In 520, the method may include detecting occurrence of a trigger associated with the user based on the execution of the scheduled communication flow. For example, the trigger may include detecting a predefined communication response (e.g., email, button press, answer on the phone, click of an ad, etc.) by the user to a communication in the scheduled communication flow. As another example, the trigger may include a non-reaction or a failing to detect a response to a communication in the scheduled communication flow.

In 530, the method may include identifying a second container organized via the user interface which is linked to the detected trigger. For example, the second container may identify one or more follow-up communications to perform based on additional actions of the user. The second container may be another campaign that is modeled via the user interface and which includes a distinct series of communications with respect to the first container. In 540, the method may include dynamically executing a trailing communication flow with respect to the scheduled communication flow based on the second container.

According to various embodiments, the first container may identify a target group of users for the scheduled communication flow and the second container may identify a different target group of users for the trailing communication flow. In some embodiments, each of the first and second containers may include a set of communications that are defined via the user interface. In some embodiments, the first and second containers may each define at least one of a series of electronic messages, a series of social media requests, and a series of telephone calls. The containers described herein may be data objects with business-based information and/or rules modeled therein to implement a flow of communication over time.

In some embodiments, the dynamically executing may include extracting contact information of the user from the target group of users of the first container and adding the extracted contact information of the user to the different target group of users of the second container. In some embodiments, the dynamically executing may include launching an initial communication stage defined in the second container after executing a communication stage associated with the trigger of the first container.

Figure 6:
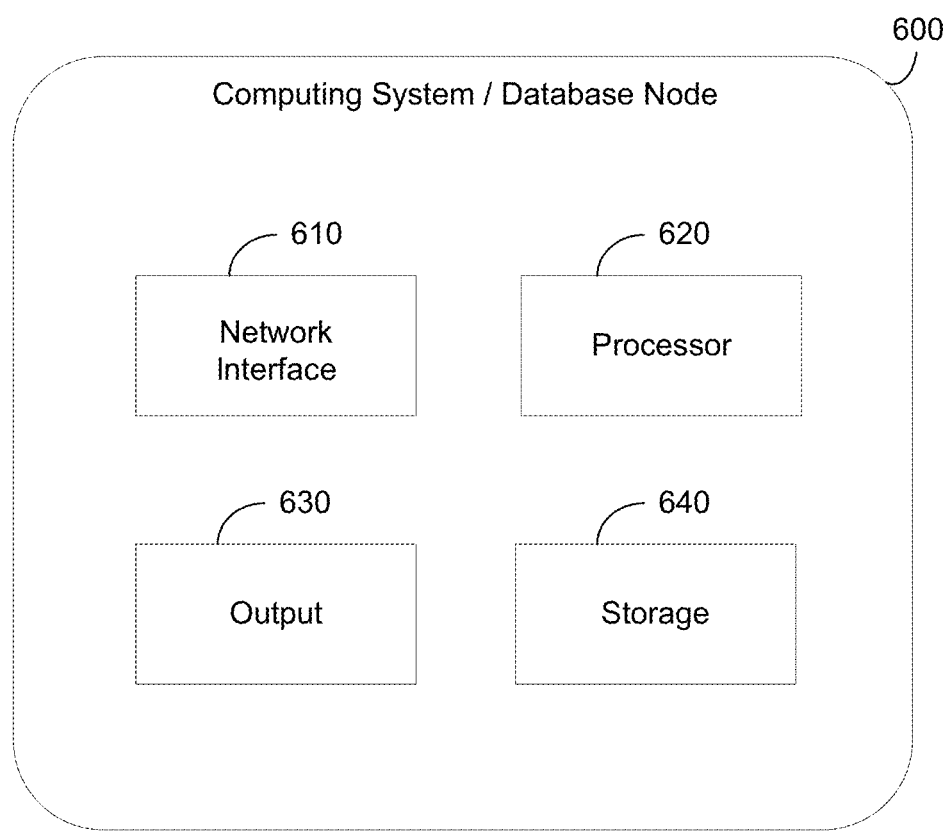
FIG. 6 is a diagram illustrating a computing system in accordance with an example embodiment.

FIG. 6 illustrates a computing system 600, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 600 shown in FIG. 6. According to various embodiments, the storage 640 may store database files and may have a partitioning scheme as shown or described in the examples herein. The storage may include a data store having a plurality of tables, partitions and sub-partitions.

According to various embodiments, the storage 640 may store a plurality of containers corresponding to a plurality of communication flows designed via a user interface of a campaign-based management application. Each container may be a model of a flow of communication. The processor 620 may execute a scheduled communication flow based on a first container organized via a user interface. For example, the first container may identify a plurality of communications to perform based on actions of a target user. The processor 620 may detect occurrence of a trigger associated with the target user based on the execution of the scheduled communication flow. Further, the processor 620 may identify a second container organized via the user interface which is linked to the detected trigger. According to various embodiments, the second container may identify one or more follow-up communications to perform based on additional actions of the target user. Furthermore, the processor 620 may dynamically execute a trailing communication flow with respect to the scheduled communication flow based on the second container.

In some embodiments, the processor 620 may extract contact information of the user from the target group of users of the first container and add the contact information of the user to the different target group of users of the second container, within the storage 640. In some embodiments, the processor 640 may execute an initial communication of the second container after execution of a most recently executed communication associated with the trigger of the first container. According to various embodiments, the processor 620 may link together a trailing campaign with an initial campaign based on a detected trigger (interaction of a target user) during execution of the initial campaign. Furthermore, the processor 620 may extract contact information of a user from the target group of the initial campaign and add that extracted contact information of the user to the target group of the trail campaign when the user matches the target criteria of the trail campaign.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a plurality of container structures of a software application identifying a plurality of communication flows; and
a processor configured to
execute a scheduled communication flow with a target user based on a modeled communication flow and contact information of the target user stored in a first container structure, the modeled communication flow identifying a plurality of communications to perform based on actions of the target user,
detect, via an application programming interface (API), occurrence of a trigger associated with the target user during execution of the scheduled communication flow,
identify, via the API, a second container structure which includes an independently modeled communication flow to perform based on actions of a predefined group of target users, and
dynamically transfer contact information of the target user from a node among a plurality of nodes linked together within the scheduled communication flow of the first container structure to a node storing contact information of the predefined group of target users among a plurality of nodes within the independently modeled communication flow of the second container structure in response to the detected trigger and execute a trailing communication flow with the target user from a root node among the plurality of nodes within the independently modeled communication flow of the second container based on the transferred contact information stored in the second container structure.

2. The computing system of claim 1, wherein the trigger comprises detecting a predefined communication response by the target user to a communication in the scheduled communication flow.

3. The computing system of claim 1, wherein the trigger comprises failing to detect a response to a communication in the scheduled communication flow.

4. The computing system of claim 1, wherein the first container structure stores a target group of users including the target user within the node of the scheduled communication flow from which the contact information is transferred and the second container structure stores a different target group of users for the independently modeled communication flow.

5. The computing system of claim 1, wherein the plurality of nodes of the modeled communication flow of the first container structure and the plurality of nodes of the independently modeled communication flow of the second container structure each comprise a string of nodes representing a sequence of communications that are defined via the user interface.

6. The computing system of claim 5, wherein the processor is configured to execute the root node of the independently modeled communication flow stored in the second container structure after execution of a most recently executed node associated with the trigger of the modeled communication flow stored in the first container structure.

7. The computing system of claim 1, wherein the first and second container structures each define at least one of a series of electronic messages, a series of social media requests, and a series of telephone calls.

8. A method comprising:
executing a scheduled communication flow with a target user based on a modeled communication flow and contact information of the target user stored in a first container structure, the modeled communication flow identifying a plurality of communications to perform based on actions of the target user;
detecting, via an application programming interface (API), occurrence of a trigger associated with the user during execution of the scheduled communication flow;
identifying, via the API, a second container structure which includes an independently modeled communication flow to perform based on actions of a predefined group of target users; and
dynamically transferring contact information of the target user from a node among a plurality of nodes linked together within the scheduled communication flow of the first container structure to a node storing contact information of the predefined group of target users among a plurality of nodes within the independently modeled communication flow of the second container structure in response to the detected trigger and executing a trailing communication flow with the target user from a root node among the plurality of nodes within the independently modeled communication flow of the second container structure based on the transferred contact information stored in the second container structure.

9. The method of claim 8, wherein the trigger comprises detecting a predefined communication response by the target user to a communication in the scheduled communication flow.

10. The method of claim 8, wherein the trigger comprises failing to detect a response to a communication in the scheduled communication flow.

11. The method of claim 8, wherein the first container structure stores a target group of users including the target user within the node of the scheduled communication flow from which the contact information is transferred and the second container structure stores a different target group of users for the independently modeled communication flow.

12. The method of claim 8, wherein the plurality of nodes of the modeled communication flow of the first container structure and the plurality of nodes of the independently modeled communication flow of the second container structure each comprise a string of nodes representing a sequence of communications that are defined via the user interface.

13. The method of claim 12, wherein the dynamically executing comprises executing the root node of the independently modeled communication flow stored in the second container structure after executing a most recently executed node associated with the trigger stored in the first container structure.

14. The method of claim 8, wherein the first and second container structures each define at least one of a series of electronic messages, a series of social media requests, and a series of telephone calls.

15. A non-transitory computer readable storage medium comprising program instructions that when executed cause a computer to perform a method comprising:
executing a scheduled communication flow with a target user based on a modeled communication flow and contact information of the target user stored in a first container structure, the modeled communication flow identifying a plurality of communications to perform based on actions of the target user;

detecting, via an application programming interface (API), occurrence of a trigger associated with the user during execution of the scheduled communication flow;

identifying, via the API, a second container structure which includes an independently modeled communication flow to perform based on actions of a predefined group of target users; and dynamically transferring contact information of the target user from a node among a plurality of nodes linked together within the scheduled communication flow of the first container structure to a node storing contact information of the predefined group of target users among a plurality of nodes within the independently modeled communication flow of the second container structure in response to the detected trigger and executing a trailing communication flow with the target user from a root node among the plurality of nodes within the independently modeled communication flow of the second container structure based on the transferred contact information stored in the second container structure.

16. The non-transitory computer readable medium of claim 15, wherein the trigger comprises detecting a predefined communication response by the target user to a communication in the scheduled communication flow.

17. The non-transitory computer readable medium of claim 15, wherein the trigger comprises failing to detect a response to a communication in the scheduled communication flow.

18. The non-transitory computer readable medium of claim 15, wherein the first container structure stores a target group of users including the target user within the node of the scheduled communication flow from which the contact information is transferred and the second container structure stores a different target group of users for the independently modeled communication flow.

19. The computing system of claim 1, wherein the processor is configured to dynamically extract the contact information from the target user and insert the extracted contact information into the node storing contact information of the predefined group of target users in response to the detected trigger.

* * * * *